(12) United States Patent
Santoru

(10) Patent No.: US 6,975,837 B1
(45) Date of Patent: Dec. 13, 2005

(54) METHOD AND APPARATUS FOR REDUCING INTERFERENCE BETWEEN TERRESTRIALLY-BASED AND SPACE-BASED BROADCAST SYSTEMS

(75) Inventor: Joseph Santoru, Agoura Hills, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 354 days.

(21) Appl. No.: 10/348,274

(22) Filed: Jan. 21, 2003

(51) Int. Cl.[7] .............................................. H04B 7/185
(52) U.S. Cl. .................... 455/12.1; 455/427; 455/13.1; 725/69
(58) Field of Search ............................. 455/12.1, 31.1, 455/427, 13.1, 430; 725/69, 49, 70, 63

(56) References Cited

U.S. PATENT DOCUMENTS

| | | |
|---|---|---|
| 3,176,301 A | 3/1965 | Wellons et al. |
| 3,430,244 A | 2/1969 | Bartlett et al. |
| 3,706,999 A | 12/1972 | Tocquec et al. |
| 3,936,837 A | 2/1976 | Coleman et al. |
| 4,263,599 A | 4/1981 | Bielli et al. |
| 4,380,014 A | 4/1983 | Howard |
| 4,660,045 A | 4/1987 | Clark |
| 4,803,495 A | 2/1989 | Monser et al. |
| 5,187,491 A | 2/1993 | Schuss et al. |
| 5,317,328 A | 5/1994 | Allen |
| 5,422,913 A | 6/1995 | Wilkinson |
| 5,483,663 A | 1/1996 | Tawil |
| 5,495,258 A | 2/1996 | Muhlhauser et al. |
| 5,584,047 A | 12/1996 | Tuck |
| 5,625,640 A | 4/1997 | Palmer et al. |
| 5,761,605 A | 6/1998 | Tawil et al. |
| 5,870,439 A | 2/1999 | Ben Efraim et al. |
| 5,905,474 A | 5/1999 | Ngai et al. |
| 5,955,783 A | 9/1999 | Ben Efraim et al. |
| 5,959,590 A | 9/1999 | Sanford et al. |
| 5,959,592 A | 9/1999 | Petruzzelli |
| 6,041,224 A | 3/2000 | Wada |
| 6,091,931 A | 7/2000 | Ben-Efraim et al. |
| 6,134,282 A | 10/2000 | Ben-Efraim et al. |
| 6,208,834 B1 | 3/2001 | Tawil et al. |
| 6,353,490 B1 | 3/2002 | Singer et al. |
| 6,353,643 B1 | 3/2002 | Park |
| 6,636,734 B1 * | 10/2003 | Berger et al. ................ 455/427 |
| 2001/0019942 A1 | 9/2001 | Tawil et al. |
| 2002/0016157 A1 | 2/2002 | Arsenault et al. |
| 2002/0025005 A1 | 2/2002 | Onggosanusi et al. |
| 2002/0032908 A1 | 3/2002 | Booth |
| 2002/0066102 A1 * | 5/2002 | Chapman et al. .............. 725/49 |
| 2002/0068526 A1 * | 6/2002 | Butte et al. ................ 455/13.1 |
| 2003/0097658 A1 * | 5/2003 | Richards ....................... 725/69 |
| 2004/0166801 A1 * | 8/2004 | Sharon et al. ............. 455/12.1 |

* cited by examiner

Primary Examiner—Sonny Trinh
Assistant Examiner—Phuoc Doan
(74) Attorney, Agent, or Firm—Georgann S. Grunebach (57) ABSTRACT

A system and method for reducing interference between communications systems sharing at a portion of at least some allocated frequency bands is described. The system comprises a first communication system broadcasting on a first set of broadcast bands having guard bands therebetween, and a second communications system broadcasting on a second set of broadcast bands substantially spanning the guard bands of the first communications system.

26 Claims, 8 Drawing Sheets

METHOD AND APPARATUS FOR REDUCING INTERFERENCE BETWEEN TERRESTRIALLY-BASED AND SPACE-BASED BROADCAST SYSTEMS

CROSS-REFERENCE TO RELATED APPLICATIONS

This application is related to the following co-pending and commonly assigned patent application(s), all of which applications are incorporated by reference herein:

application Ser. No. 09/480,089, entitled "METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES," filed on Jan. 10, 2000, by Paul R. Anderson, which application claims priority to U.S. Provisional Application No. 60/169,005, filed Dec. 3, 1999 by Paul R. Anderson, and entitled "METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES"; and application Ser. No. 09/992,992, entitled "METHOD AND APPARATUS FOR REDUCING EARTH STATION INTERFERENCE FROM NON-GSO AND TERRESTRIAL SOURCES," by Joseph Santoru and Ernest C. Chen, filed Nov. 6, 2001.

BACKGROUND OF THE INVENTION

1. Field of the Invention

The present invention relates to systems and methods for broadcasting information signals, and in particular to a system and method for reducing interference between independent terrestrially-based and space-based broadcasting systems.

2. Description of the Related Art

It has been proposed to cooperatively share the current Broadcasting-Satellite Service (BSS) frequency bands to allow additional programming material to be transmitted to subscribers of other broadcast systems using the same frequency bands as currently used by BSS satellites. The other systems may be implemented through the use of non-geostationary orbit (GSO) and/or terrestrially-based transmitters to transmit the additional programming. Such systems typically rely on spatial diversity to minimize the probability of interference. This usually requires a BSS satellite ground antenna having highly directional, monocular sensitivity characteristics in order to realize low interference levels.

Unfortunately, existing BSS antennae do not exhibit a highly directional sensitivity characteristic. Instead, as described in application Ser. No. 09/480,089, entitled "METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES," which application is hereby incorporated by reference, existing BSS antennae exhibit a sensitivity characteristic that includes substantial sensitivity in a rearward direction. They also exhibit sensitivity characteristics in the sideward and upward directions. This sensitivity can result in substantial interference between transmissions from BSS satellites and transmissions from non-GSO or terrestrial sources.

Solutions have been proposed to reduce interference, including those described in the related applications described above. However, even when using the methods described in the above-referenced patent applications, excessive interference with existing BSS system broadcasts may result.

Two-way communication systems has been proposed which would allow consumers to transmit narrowband interstitial return path signals within the 12.2–12.7 GHz frequency bands already used by digital broadcast service providers. However, these systems limit the interstitial transmission to reverse link transmissions (from subscribers to terrestrially based antennae). One of the reasons that such systems have been limited in the past to reverse link transmissions is because it has been assumed that the limited bandwidth available on the interstitial signals is suitable only for low data rate transmissions.

Interstitial return link transmissions are typically made possible by the use of high-directivity ground antennae at the subscriber's location. Such antennae make it feasible for each subscriber antenna to direct energy in a narrow beam to the terrestrial antenna, thereby spatial diversity can be used to minimize transmission interference. However, it is not economically feasible for the terrestrial antenna to direct an individual beam to each subscriber. Hence, such methods are generally inapplicable to forward link communications.

What is needed is a further method for isolating current BSS transmissions from proposed forward link transmissions from terrestrially based transmitters. The present invention satisfies that need at least in part by taking advantage of the spatial diversity provided by multiple and spot-beam capable broadcast satellites, and the use of spatial and polarization diversity to minimize interference while maximizing forward path transmission bandwidth.

SUMMARY OF THE INVENTION

To address the requirements described above, the present invention discloses a system and method for reducing interference between terrestrially-based and space-based communications systems. The system comprises a first communications system having a plurality of substantially geosynchronous satellites broadcasting a first set of information signals to a first plurality of terrestrial receiver stations and a second communications system having a plurality of terrestrially-based transmitters transmitting a second set of information signals to a second plurality of terrestrially-based terrestrial receiver stations, wherein the first set of information signals each have independent content from and are spatially diverse from the second set of information signals. The first set of information signals are broadcast via one or more of a first plurality of broadcast bands having guard bands therebetween, and the second set of information signals are broadcast on one or more of a second plurality of broadcast bands, each of the second plurality of broadcast bands associated with and substantially spanning one of the first information signal bands.

The method comprises the steps of broadcasting the first set of information signals via one or more of a first plurality of broadcast bands having guard bands therebetween having substantially no information signal; and broadcasting the second set of information signals via one or more of a second plurality of broadcast bands, each of the second plurality of broadcast bands associated with and substantially spanning one of the first information signal guard bands.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

SATELLITE COMMUNICATION SYSTEM

Figure 1:
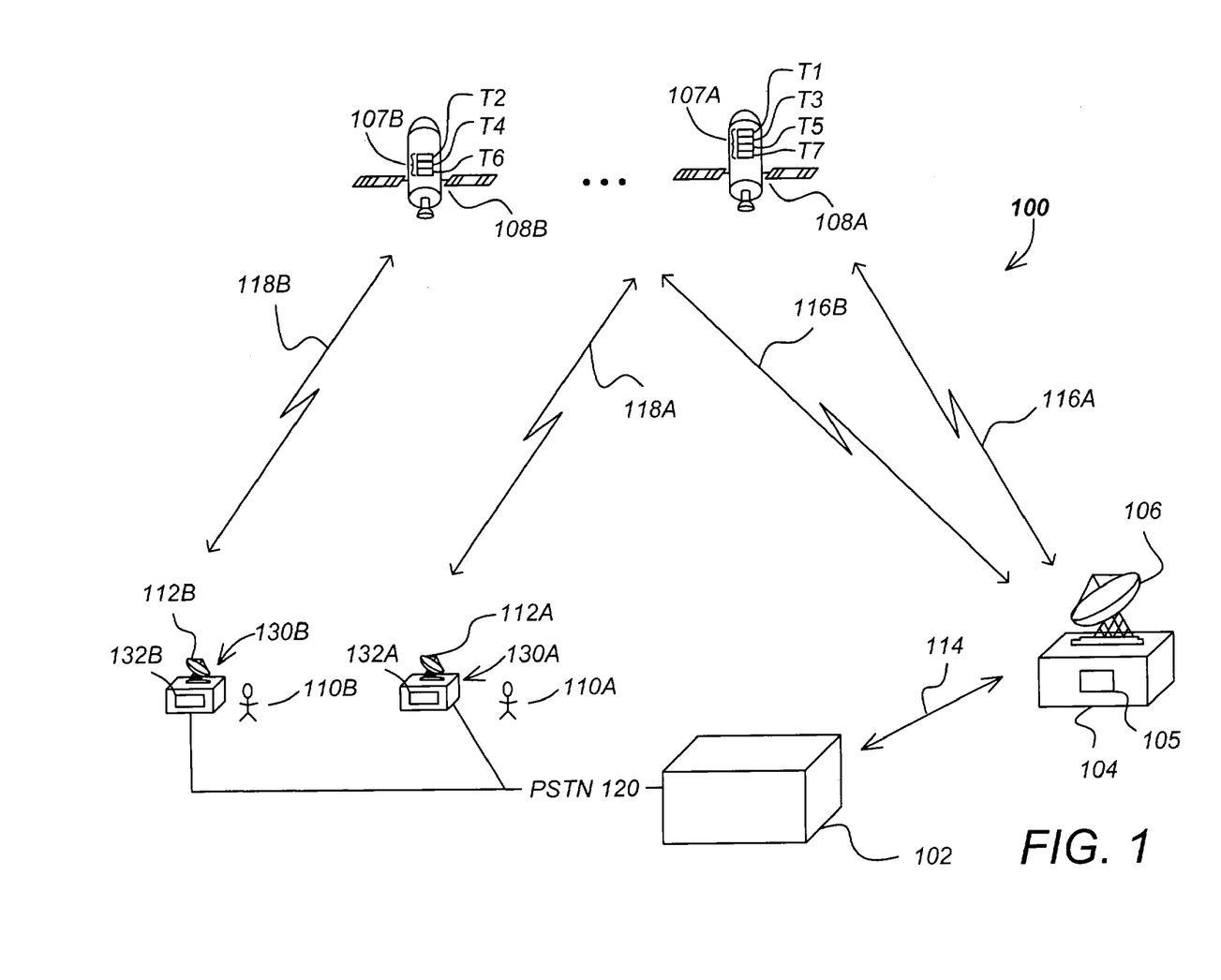
FIG. 1 is a diagram illustrating an overview of a satellite communication system 100.

FIG. 1 is a diagram illustrating an overview of a satellite communication system 100, which can be used to broadcast a first set of information signals having broadcast video programs, data, or other information to a plurality of subscribers. The satellite communication system 100 comprises a control center 102 in communication with an uplink center 104 via a ground or other link 114 and one or more integrated receiver/decoders (IRDs) 132A and 132B (hereinafter alternatively referred to as IRD(s) 132) at a plurality of receiver stations 130A and 130B (hereinafter alternatively referred to as receiver station(s) 130) via a public switched telephone network (PSTN) or other link 120. The control center 102 provides one or more of the first set of information signals to the uplink center 104, and coordinates with the receiver station(s) 130 to offer subscribers 110 pay-per-view (PPV) program services, including billing and associated decryption of video programs.

The uplink center 104 receives data and/or program control information from the control center 102, and using an uplink antenna 106, transmits a first set of information signals via a first set of broadcast bands having guard bands therebetween to one or more satellites 108A and 108B (hereinafter alternatively referred to as satellite(s) 108). The satellite(s) 108 receive and process this information, and transmit the data received from the uplink center 104 to the IRD(s) 132 at the receiver station(s) 130 via downlinks 118A and 118B (hereinafter alternatively referred to as downlink(s) 118). The IRD(s) 132 receive this information using the subscriber antennae 112A and 112B (hereinafter alternatively referred to as subscriber antenna(e) 112), to which each of the IRD(s) 132 are communicatively coupled.

As shown in FIG. 1, satellite 108A includes a first (odd) transponder bank 107A, which includes a plurality of transponders T1, T3, T5, and T7. Also, satellite 108B includes a second (even) transponder bank 107B, which includes a second plurality of transponders T2, T4, and T6. The transponders T1–T7 each accept a signal from the uplink center 104 and retransmit (e.g. broadcast) the received signal to the receiver stations 110.

The transponders T1–T7 typically implement a "bent-pipe" communication system. That is, transponders T1–T7 typically receive and downconvert the signal from the uplink frequency to a downlink frequency, and retransmit that downconverted signal to the receiver stations 110. In one embodiment, the uplink signals are downconverted from the 17.3–17.8 GHz frequency band to the 12.2–12.7 GHz frequency band. Non-bent-pipe communication systems can also be used. For example, if desired, the satellites 108 may include modules for demodulating the uplink signal and remodulating the demodulated uplink signal to generate the downlink signal. Additional processing can also be performed using the received signal.

In one embodiment, the satellites 108A and 108B are disposed in a substantially geosynchronous (GEO) or geostationary (GSO) orbit. That is, the satellites are deployed so that their apparent position in the sky, when viewed by the receiver stations 110 either remains in one place does not move beyond the effective beamwidth of the receiving antenna 112.

The plurality of satellites 108A and 108B can be used to provide wider terrestrial coverage, to provide additional channels, or to provide additional bandwidth per channel to subscribers. Although six transponders (T1–T7) are shown, a greater or lesser number of transponders may be used. In one embodiment of the invention, each of the satellite(s) 108 comprise 16 transponders to receive and transmit program material and other control data from the uplink center 104 and provide it to the subscribers 110. However, the transmission capacity of each transponder T1–T7 can be increased using advanced modulation and coding, data compression, and multiplexing techniques. For example, two-satellites 108 working together can receive and broadcast over 150 conventional (non-HDTV) audio and video channels via 32 transponders.

The uplink station 104 can transmit the same uplink information to both satellites 108A and 108B, or different information (e.g. only the information that is retransmitted by the satellite 108) to each satellite 108. This can be accomplished using spatial diversity (e.g. a directional antenna 106 which is directed only at the selected satellite (108A or 108B, but not both) and additional uplink stations 104, if desired.

Figure 2:
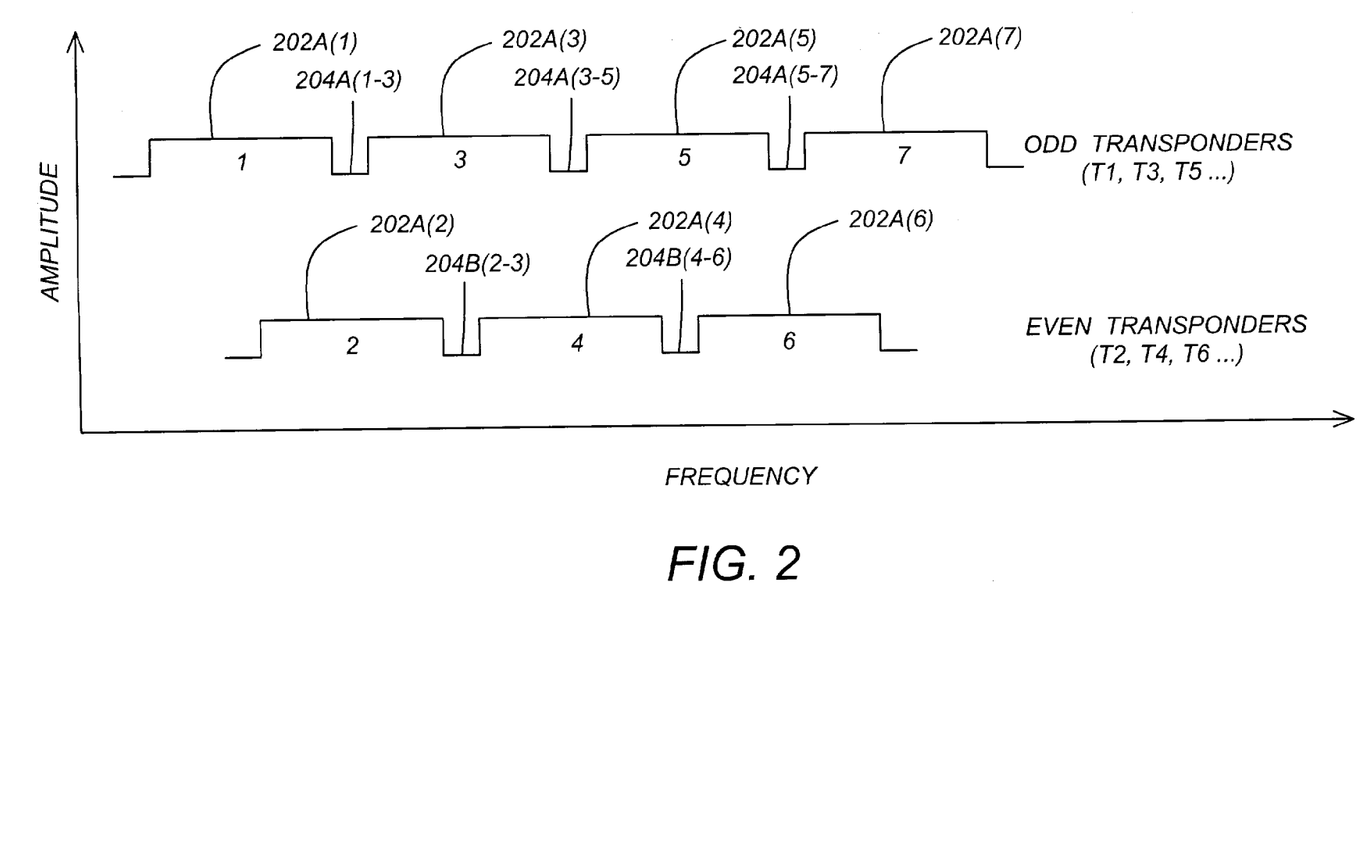
FIG. 2 is a diagram illustrating a representative transmission spectrum.

FIG. 2 is a diagram illustrating a representative radio frequency (RF) transmission spectrum for transponders T1–T7.

Each transponder T1–T7 transmits in an assigned broadcast band 202(1)–202(7). The broadcast bands 202(1)–202(7) (hereinafter alternatively referred to as broadcast band(s) 202) are separated from adjacent broadcast bands by guard bands 204(1–3)–204(5–7) (hereinafter alternatively referred to as broadcast band(s) 204). For example, broadcast bands 202(1) and 202(3) (used by transponders T1 and T3, respectively) are separated by guard band 204(1–3). The guard bands 204(1–3)–204(5–7) prevent signals from the broadcast bands 202(1)–202(7) from interfering with one another. The width of the guard bands 204(1–3)–204(5–7) is selected to provide adequate isolation between broadcast bands 202(1)–202(7) to prevent unacceptable interference. This is typically a function of the technique used to modulate the signal on broadcast bands 202(1)–202(7), the quality of the transponders T1–T7 and receiver stations 130, as well as other factors. In one embodiment, the broadcast bands are 24 MHz wide, whereas the guard bands are 5.16 MHz wide.

In the illustrated example, guard bands for the odd transponders T1, T3, T5, and T7 are centered at the center of the broadcast bands for the even transponders T2, T4, and T6. Hence, guard band 204(1–3) is centered at the center of broadcast band 202(2), guard band 204B(2–3) is centered at the center of broadcast band 202(3) and so on.

It is noted that in the spectrum shown in FIG. 2, each of the broadcast bands 202(1)–202(7) share a portion of a frequency spectrum with another of the broadcast bands 202(1)–202(7). For example, broadcast band 202(1) shares a spectrum band 206 with broadcast band 202(2). With such a system, techniques are employed to prevent interference between the broadcast bands. This can be accomplished by via selection of appropriate modulation or multiplexing techniques, spatial diversity, and polarization diversity, or a combination of such techniques. For example, if antenna 112B is directed at satellite 108B and is sufficiently directional to exclude significant energy from the first satellite 108A, broadcast band 202(1), used by transponder T1 on satellite 108A, will not interfere with broadcast band 201(2), which is used by transponder T2 on satellite 108B. In another embodiment broadcast bands 202(1)–202(7) can be distinguished from one another via polarization or modulation technique (e.g. QPSK, 8PSK, CDMA).

In one embodiment, the center frequency of the broadcast band for transponder T1 is 12.224 GHz and the guard band between adjacent transponders is 5.16 MHz.

Figure 3A:
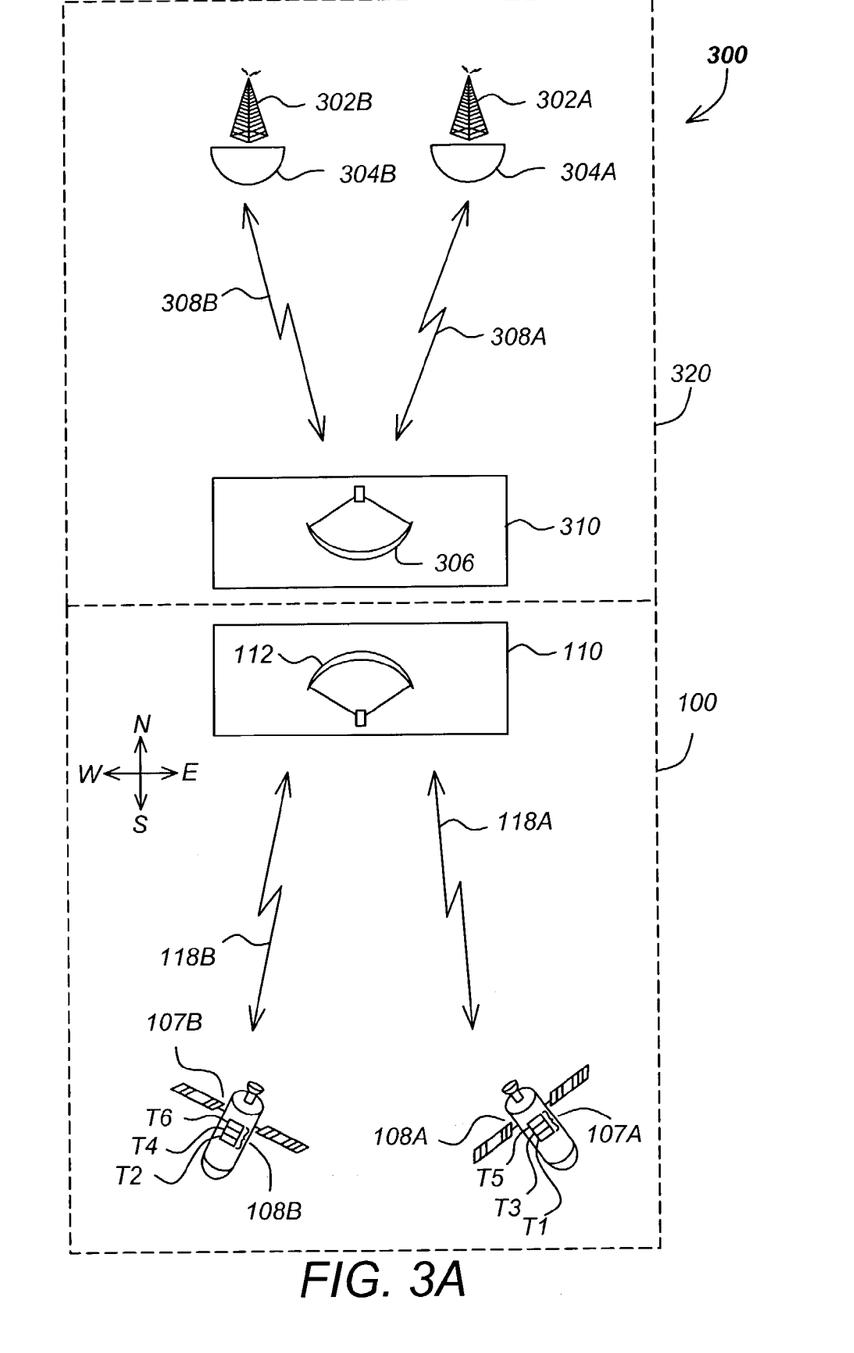
FIGS. 3A–3D are diagrams illustrating different embodiments of a composite communication system.

FIG. 3A is a diagram illustrating a top-view of a composite communication system 300, which includes a first, the satellite-based communication system 100 described above and a second, terrestrially-based communication system 320. The second communications system 320 includes a first terrestrially-based transmitter 302A and a second terrestrially based transmitter 302A (hereinafter alternatively referred to collectively as terrestrial transmitter(s) 302). The terrestrial transmitter(s) transmit a second set of information signals to a plurality of second subscribers 310 via second communication system subscriber antennae 306 and links 308A and 308B. The terrestrially-based communication system 320 transmits a second set of information signals on one or more of a second plurality of broadcast bands.

Spatial diversity can be used to reduce interference between the first communication system 100 and the second communications system 320. This is accomplished by selecting the transmission characteristic 304A and 304B of the transmitter(s) 302 to direct the second set of information signals in a direction away from the sensitive axis of first communication system subscriber antennae 112 and in a direction towards the sensitive axis of the second communication system subscriber antennae 306 sensitive axis.

Figure 3B:
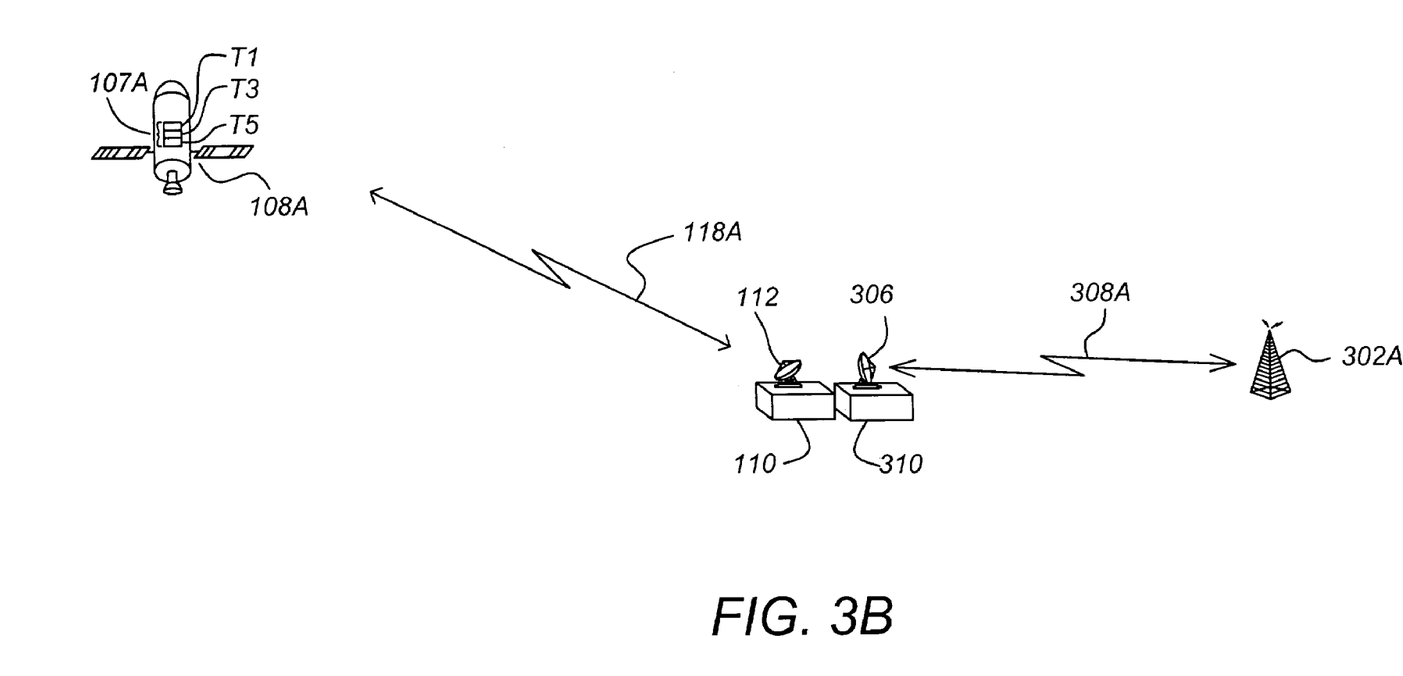

FIG. 3B is a side view of the composite communication system illustrated in FIG. 3A.

Figure 3C:
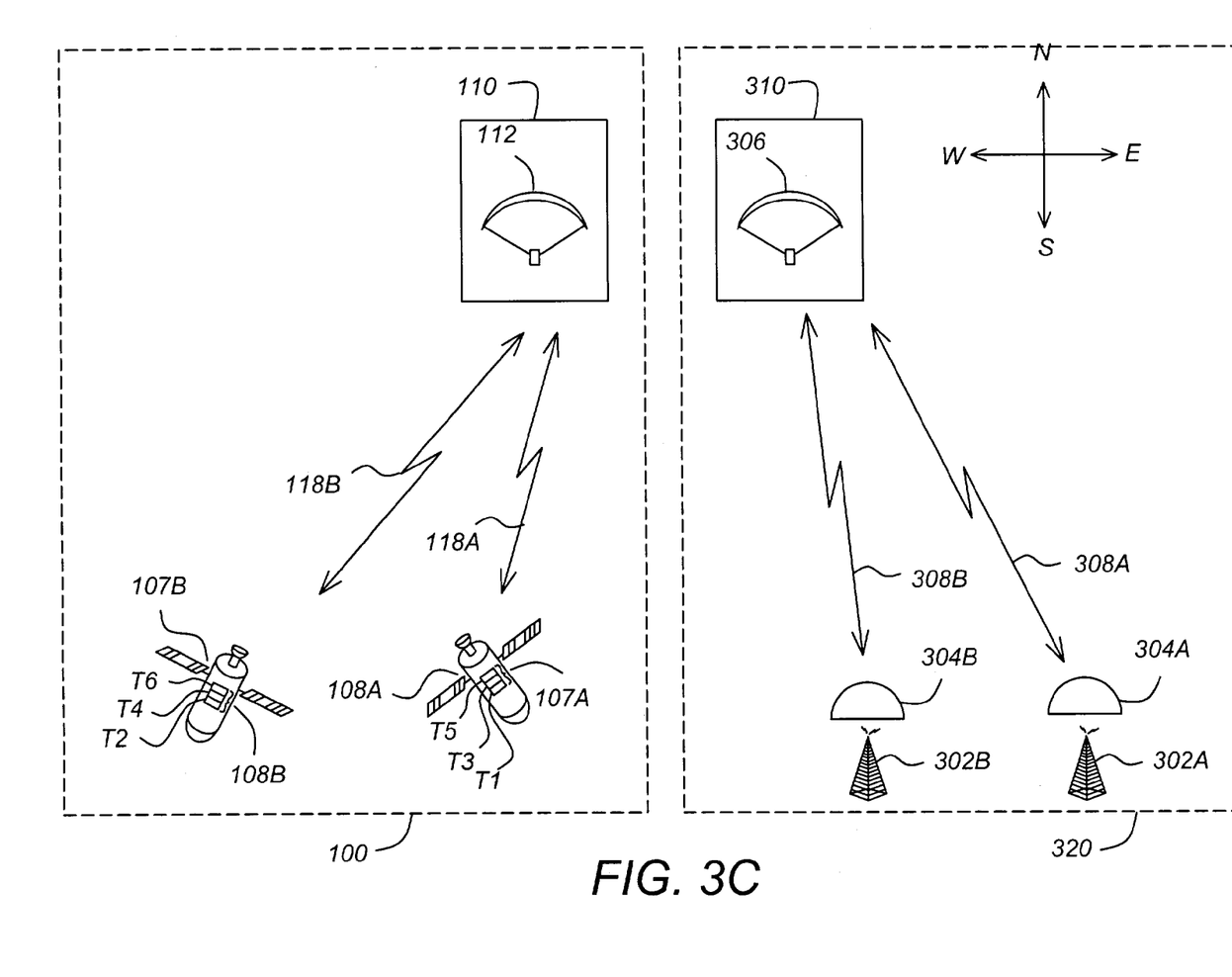

FIG. 3C is a top view of a second embodiment of the composite communication system. In this embodiment, spatial diversity is also used to reduce interference between the first communication system 100 and the second communication system 320, however, this spatial diversity is accomplished by unique sensitivity characteristics of the subscriber antennae 112 which have a "hole" (reduced sensitivity) along vectors from the subscriber antennae to the other communication system (e.g. subscriber antenna 112 has reduced sensitivity along a vector from the subscriber antenna 112 to the transmitter 302 of the second communication system 320, and/or the subscriber antenna 306 has a reduced sensitivity along a vector from the subscriber antenna 306 to the first communication system 100.

Figure 3D:
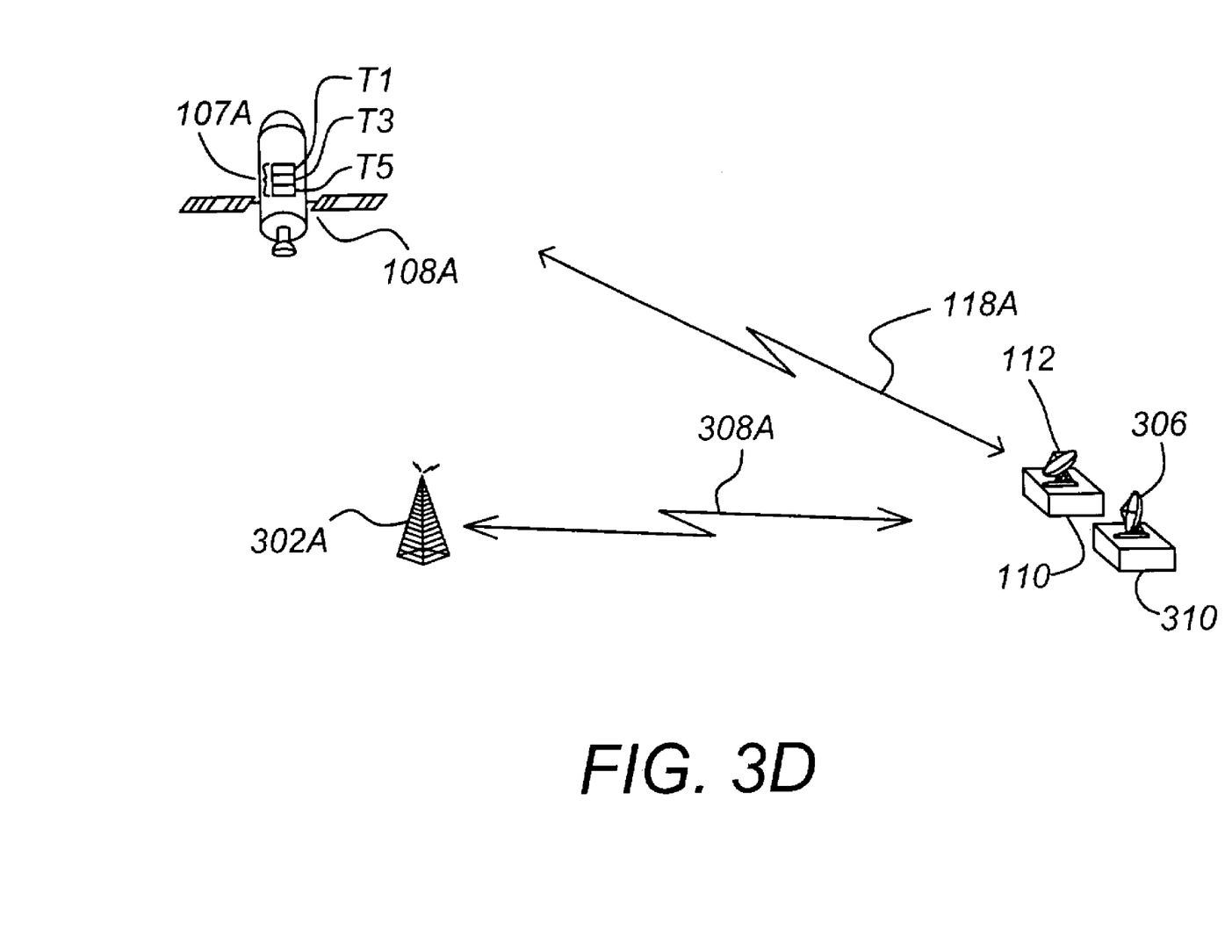

FIG. 3D is a side view of the composite communication system illustrated in FIG. 3C.

Figure 4:
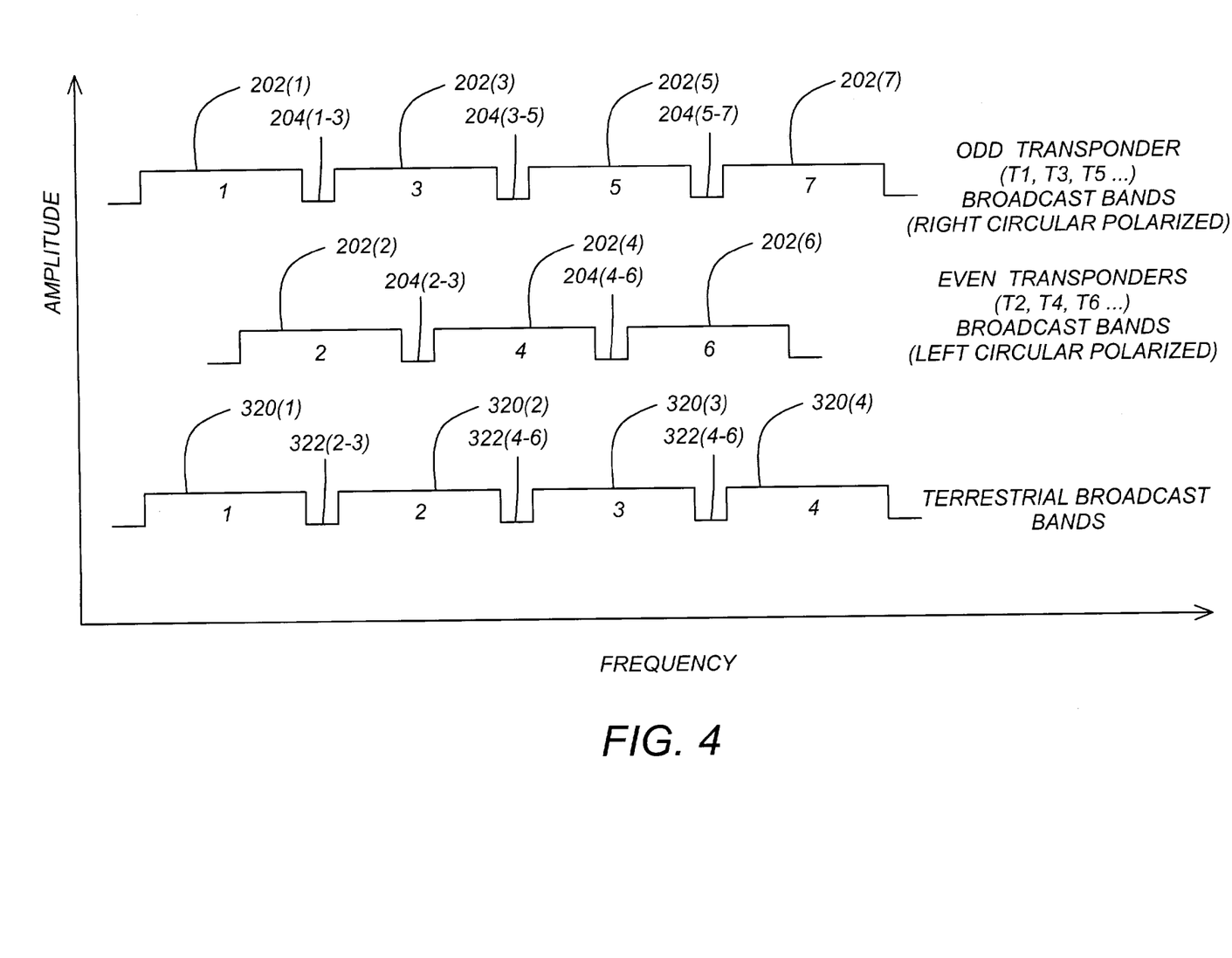
FIG. 4 is a diagram illustrating broadcast and guard bands of a composite communication system.

FIG. 4 is a diagram illustrating a relationship between the first set of broadcast bands 202(1), 202(3), 202(5), and 202(7) second plurality of broadcast bands 320(1)–320(4) that are used by the second communication system 320 to transmit the second set of information signals. Since the terrestrial broadcast bands 320(1)–320(4) coincide with those of the first communications system 100 (in particular, with bands 202(1), 202(3), 202(5), and 202(7) associated with the odd transponders 1, 3, 5, and 7), the frequency diversity is not assured, and the first set of information signals may interfere with the second set of information signals and vice versa. Interference is also possible between bands 202(2), 202(4), and 202(6) and terrestrial broadcast bands 320(1)–320(4). However, since there is less overlap of the broadcast bands (due to the guard bands), interference between these bands will generally be less.

The second plurality of broadcast bands of the second communications system 320 correspond to the odd numbered transponders of the first communications system 100. That is, the first broadcast band 320(1) (e.g. channel 1) would completely overlap broadcast band 202(1) (24 MHz total bandwidth). Although spatial diversity can somewhat ameliorate the problem, if the polarization of the second communications system 320 were linear and the polarization of channels one and two of the first communications system 100 were left and right circularly polarized, respectively, channel one of the second communications system 320 may introduce interference into both channel one and channel two of the first communications system 100.

Figure 5:
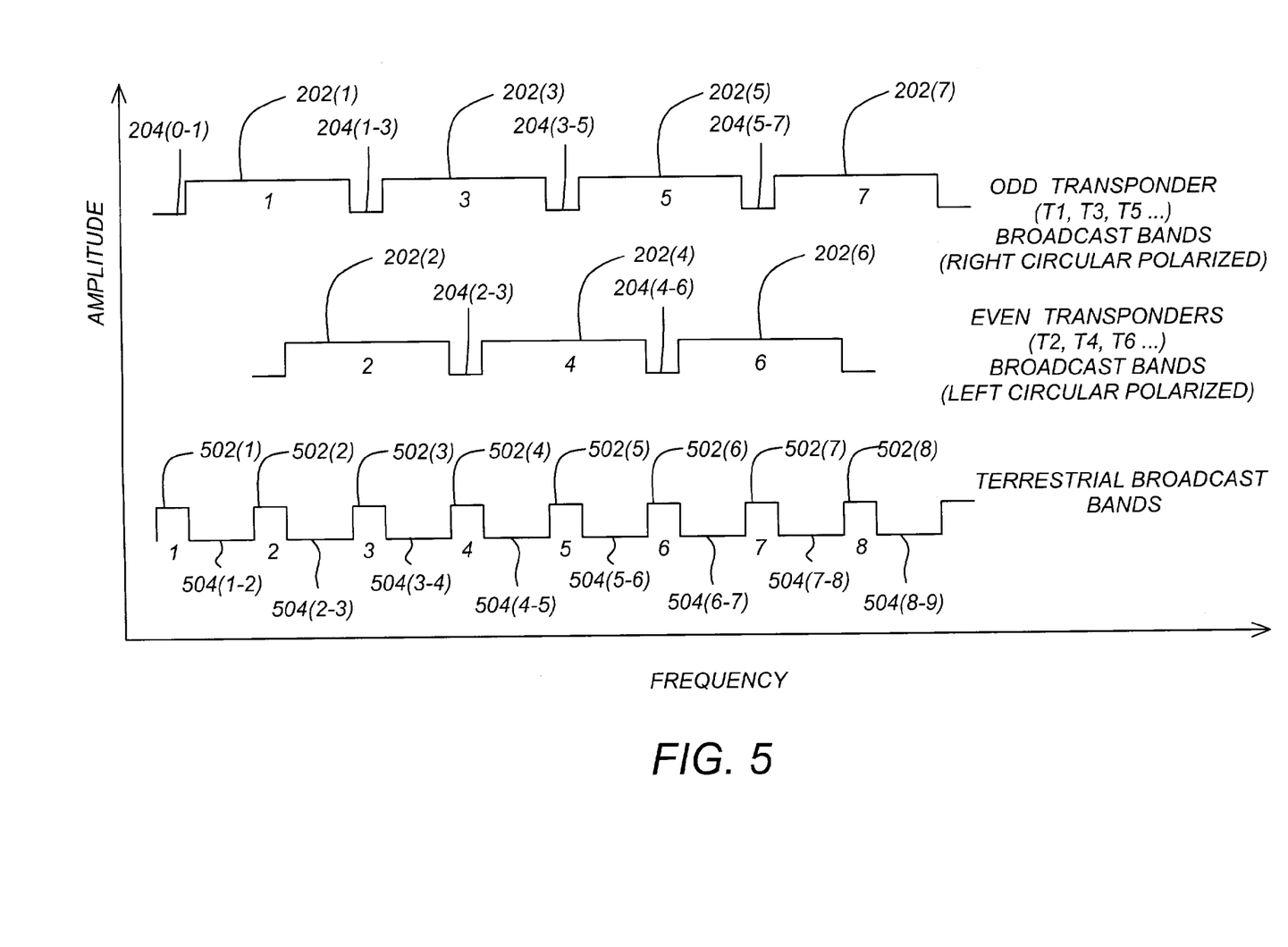
FIG. 5 is a diagram illustrating another embodiment of broadcast and guard bands of a composite communications system.

FIG. 5 is a diagram illustrating another relationship between the first set of broadcast bands 202(1)–202(7) and a second set of broadcast bands 502(1)–502(8). Each pair of the second set of broadcast bands 502(1)–502(8) (hereinafter alternatively referred to as broadcast band(s) 502) includes a guard bands 504(1–2), 504(2–3), 504(3–4), 504(4–5), 504(5–6), 504(6–7), 504(7–8), and 504(8–9), (hereinafter alternatively referred to as guard band(s) 504) disposed therebetween. For example, guard band 502(1–2) is disposed between broadcast bands 502(1) and 502(2) and guard band 502(2–3) is disposed between broadcast bands 502(2) and 502(3).

Band-assignment parameters (e.g. number, distribution, and bandwidth of broadcast bands as well as the number, distribution, and bandwidth of the guard bands) can be chosen to minimize disruption of the data transmission and interference objectives of the first communications system 100 while simultaneously providing for data communications using the second communications system 320. In one embodiment, the bandwidth of the broadcast bands of the second communication system 320 is selected as substantially the same bandwidth as the guard bands of the first communication system 100, and the number and distribution of the broadcast bands of the second communications system 320 are selected to coincide with the guard bands of the first communications system 100. Preferably, at least one of the broadcast bands 502 of the second communications system 320 substantially span the associated guard band 204 of the first communications system 100. In one exemplary embodiment, the guard bands 204 of the first communications system 100 and the broadcast bands 502 of the second communications system 320 are both 5 MHz wide, and centered at the same frequencies. The frequency overlap between the second broadcast band 502(2) of the second communications system 320 and the first broadcast band 202(1) (transponder T1) of the first communications system 100 is 5 MHz. In this situation, the overlap between the broadcast band 502(2) and 202(1) is 5 MHz/24 MHz or 0.208 (or about −6.8 dB). Hence, if the power per Hz first communications system broadcast band 202(1) and the second communications system broadcast bands 502(2) are equal, the power of the signal from the second communications system 302 (broadcast using broadcast band 502(2)) within the first communication system broadcast band 202 (1) is about 6.8 dB less than that of the signal from the first communication system 100. Further, since second communication system broadcast bands 502(1) and 502(3) are within the guard bands (e.g. 204(0–1) and 204(1–3), the interference contribution from the channels using broadcast bands 502(1) and 502(3) will be much smaller than the contribution from channels using broadcast band 502(2).

A reduction of −6.8 dB is significant, and has the effect of reducing the distance at which any specified interference threshold is found by more than one half. For example, if it is found that the threshold for harmful interference from the second communications system 320 on the first communications system 100 is at a distance of 4 kilometers from the transmission source 302 of the second communications system 320, the foregoing technique would reduce this distance to approximately $$4 \text{ km} \cdot \left[10^{\frac{-6.8}{10}}\right]^{\frac{1}{2}} = 1.8 \text{ km},$$

thus permitting service to more customers and/or reducing interference in existing broadcast satellite services. Similarly, the level of separation may be maintained, yet interference with the first communication system 100 reduced accordingly.

The bandwidth of the broadcast bands 502 of the second communications system 320 can be selected to be greater or less than that of the guard bands 204 of the first communications system 100. All other things equal, increasing the bandwidth of the broadcast bands 502 relative to the width of the guard bands 204 will increase interference between the first communications system 100 and the second communications system 320, and decreasing the bandwidth of the broadcast bands 502 relative to the width of the guard bands 204 will decrease interference, but will also reduce data throughput in the second communications system 320 channels. It should also be noted that while the frequency bands are presented with infinite rising and declining slopes (e.g. as if implemented with infinite pole filters), the actual delineation between broadcast bands and guard bands is not typically as well-defined, but rather, defined in terms of thresholded amplitude (e.g. a broadcast band may be defined as the band in which the signal magnitude exceeds −20 dB or other value from the amplitude at the center of the broadcast band). Indeed, one of the reasons for using the guard bands 204 of the first communication system 100 between broadcast bands 202 is to account for this characteristic and assure that there is adequate separation between broadcast bands so as to minimize interference. Hence, the phrase "substantially span" as it is used above, refers to a relationship between the bandwidth and center frequency of each of the broadcast band(s) 502 of the second communications system 320 to the bandwidth and center frequency of the related guard bands 204 of the first communications system 100 such that the transmission capacity of the second communications system 320 on such broadcast bands 502 meets design objectives, while also minimizing interference to the broadcast bands 202 of the first communication system 100 to an acceptable degree. Thus, the bandwidth of the broadcast bands 502 of the second communications system 320 may be less than that of the bandwidth of the guard bands 204 of the first communication system 100 (e.g. to account for the non-ideal behavior described above), or may be greater than the bandwidth of the guard bands 204 of the first communication system (e.g. allowing some frequency overlap-induced interference that can be either accepted or ameliorated by other techniques, including spatial diversity, polarization diversity, or modulation techniques).

The data transmission capacity of the second communications system 320 can be selected to maximize data throughput and minimize interference. For example, if the channel allocation for the second communication system 320 shown in FIG. 4 included 16 channels with 24 MHz bandwidth and quadrature phase-shift keying (QPSK) modulation, it could achieve a payload data rate of approximately 30.3 Mbits/sec. With a 6/7 code rate, a total payload data rate would be approximately 16×30.3 Mbits/sec= 48.4 Mbits/sec. However, if the channel allocation shown in FIG. 5 is used instead, the data rate (assuming the same modulation technique and code rate) would be approximately 30.3*(5/24)=6.3 Mbits/sec per channel. Using 34 channels would provide a total payload data rate of approximately 6.3×34=214.2 Mbits/sec. This is about 44% of the total payload data rate that is obtainable with the system shown in FIG. 4.

However, the data throughput of the second communication system 320 can be improved through judicious choice of channel center frequency and bandwidth allocation, in order to account for different modulation techniques and/or signal characteristics between the first communication system 100 and the second communications system 320. Further, the modulation and/or coding of the signal from the second communications system 320 and the first communications system 100 can be selected to further minimize interference and/or provide additional data throughput. For example, a data rate of about 38 Mbits/sec could be realized using the same carrier to noise (C/N) ratio needed for QPSK 6/7 modulation and coding. Hence, a channel on a 5 MHz bandwidth broadcast band of the second communication system 320 could have a payload data rate of about 38*(5/24)=7.9 Mbits/sec, thus providing about 268.6 Mbits/sec on 34 channels. This is approximately 55% of the total payload rate that is obtainable with the system shown in FIG. 4.

Further techniques can be employed to maximize the data transmission capacity of the second communications system 320, including, for example, turbo-coding techniques. Such techniques are described in C. Berrou, A. Glavieux, and P. Thitimajshima, "Near Shannon limit error-correcting coding and decoding: Turbo-codes(1),", in Proc. ICC'93, Geneva, Switzerland, May 1993, pp. 1064–1070", which is hereby incorporated in reference.

Although the foregoing has been described with respect to an embodiment in which the program material delivered to the subscriber is video (and audio) program material such as a movie, the foregoing method can be used to deliver program material comprising purely audio information or data as well.

Also, the present invention can be used to prevent communication interference between existing satellite subscription services and other services that use space-based (e.g.

Middle Earth Orbit or Lower Earth Orbit), or suborbital (e.g. atmospherically based) subscription services.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the invention disclosed herein will be described with reference to a satellite based satellite communication system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A communications system, comprising
a first communications system having a plurality of substantially geosynchronous satellites broadcasting a first set of information signals to a first plurality of terrestrial receiver stations;
the first communication system satellites including first communication system satellite having a first plurality of transponders transmitting a first subset of information signals on a first subset of the first plurality of broadcast bands at a first polarization and a second communication system satellite having a second plurality of transponders transmitting a second subset of the first set of information signals on a second subset of the first plurality of broadcast bands at a second polarization substantially isolated from the first polarization;
a second communications system having a plurality of terrestrially-based transmitters transmitting a second set of information signals to a second plurality of terrestrially-based terrestrial receiver stations, wherein the first set of information signals each have independent content from and are spatially and polarizationally diverse from the second set of information signals;
wherein the first set of information signals are broadcast via one or more of a first plurality of broadcast bands having guard bands therebetween; and
wherein the second set of information signals are broadcast on one or more of a second plurality of broadcast bands, each of the second plurality of broadcast bands associated with and substantially spanning one of the first information signal guard bands.

2. The communications system of claim 1, wherein at least a portion of the broadcast bands of the second plurality of broadcast bands are centered at the guard bands.

3. The communications system of claim 2, wherein a bandwidth of at least a subset of the second plurality of broadcast bands is less than a bandwidth of the associated band of the plurality of first broadcast bands.

4. The communications system of claim 1, wherein each of the plurality of satellites are in a geosynchronous orbit.

5. The communications system of claim 1, wherein:
each of the first communication system satellites include a first plurality of transponders transmitting on a first subset of the first plurality of broadcast bands and a second plurality of transponders transmitting on a second subset of the first plurality of broadcast bands, and wherein the guard bands of the first subset of the first plurality of broadcast bands are substantially centered at center frequencies of the second subset of the first plurality of broadcast bands.

6. The communications system of claim 1, wherein at least a portion of the second set of information signals are turbo-coded.

7. The communications system of claim 1, wherein
the at least a portion of the first set of information signals are coded according to a first coding scheme, and at least a portion of the second set of information signals are coded according to a second coding scheme different from the first coding scheme.

8. The communications system of claim 1, wherein the first set of information signals are modulated according to a first modulation scheme and the second information signals are modulated according to a second modulation scheme.

9. The communications system of claim 1, wherein a bandwidth of at least a subset of the second plurality of broadcast bands is greater than a bandwidth of the first information signal guard bands.

10. A method of broadcasting a first set of information signals from a first communications system having a plurality of geosynchronous satellites to a first plurality of terrestrial receiver stations and a second set of information signals, independent in content and spatially diverse from the first set of information signals, from a second communications system having a plurality of terrestrially-based transmitters to a second set of terrestrial receiver stations, comprising the steps of:
broadcasting the first set of information signals via one or more of a first plurality of broadcast bands having guard bands therebetween having substantially no information signal; and
broadcasting the second set of information signals via one or more of a second plurality of broadcast bands, each of the second plurality of broadcast bands associated with and substantially spanning at least one of the first information signal guard bands.

11. The method of claim 10, wherein each of the second plurality of broadcast bands are centered at the guard bands.

12. The method of claim 11, wherein a bandwidth of at least a subset of the second plurality of broadcast bands is less than a bandwidth of the associated guard band of the plurality of first broadcast bands.

13. The method of claim 10, wherein each of the plurality of satellites are in a geosynchronous orbit.

14. The method of claim 10, wherein:
each of the first communication system satellites include a first plurality of transponders transmitting on a first subset of the first plurality of broadcast bands and a second plurality of transponders transmitting on a second subset of the first plurality of broadcast bands, and wherein the guard bands of the first subset of the first plurality of broadcast bands are substantially centered at center frequencies of the second subset of the first plurality of broadcast bands.

15. The method of claim 10, wherein at least a portion of the second set of information signals are turbo-coded.

16. The method of claim 10, wherein
the at least a portion of the first set of information signals are coded according to a first coding scheme, and at least a portion of the second set of information signals are coded according to a second coding scheme different from the first coding scheme.

17. The method of claim 10, wherein the first set of information signals are modulated according to a first modulation scheme and the second information signals are modulated according to a second modulation scheme.

18. A communications system, usable with a first communications system having a plurality of substantially geosynchronous satellites broadcasting a first set of information signals to a first plurality of terrestrial receiver stations wherein the first set of information signals are broadcast via one or more of a first plurality of broadcast bands having guard bands therebetween, comprising:
a plurality of terrestrially-based transmitters transmitting a second set of information signals to a second plurality of terrestrial receiver stations;
wherein the first set of information signals each have independent content from and ate spatially diverse from the second set of information signals; and
wherein the second set of information signals are broadcast on a second plurality of broadcast bands, each of the second plurality of broadcast bands associated with and substantially spanning one of the first information signal guard bands.

19. The communications system of claim 18, wherein at least a portion of the broadcast bands of the second plurality of broadcast bands are centered at the guard bands.

20. The communications system of claim 19, wherein a bandwidth of at least a subset of the second plurality of broadcast bands is less than a bandwidth of the associated guard band of the plurality of first broadcast bands.

21. The communications system of claim 18, wherein each of the plurality of satellites are in a geosynchronous orbit.

22. The communications system of claim 18, wherein:
each of the first communication system satellites include a first plurality of transponders transmitting on a first subset of the first plurality of broadcast bands and a second plurality of transponders transmitting on a second subset of the first plurality of broadcast bands, and wherein the guard bands of the first subset of the first plurality of broadcast bands are substantially centered at center frequencies of the second subset of the first plurality of broadcast bands.

23. The communications system of claim 18, wherein at least a portion of the second set of information signals are turbo-coded.

24. The communications system of claim 18, wherein
the at least a portion of the first set of information signals are coded according to a first coding scheme, and at least a portion of the second set of information signals are coded according to a second coding scheme different from the first coding scheme.

25. The communications system of claim 18, wherein the first set of information signals are modulated according to a first modulation scheme and the second information signals are modulated according to a second modulation scheme.

26. An apparatus for broadcasting a first set of information signals from a first communications system having a plurality of geosynchronous satellites to a first plurality of terrestrial receiver stations and a second set of information signals, independent in content and spatially diverse from the first set of information signals, from a second communications system having a plurality of terrestrially-based transmitters to a second set of terrestrial receiver stations, comprising:
means for broadcasting the first set of information signals via one or more of a first plurality of broadcast bands having guard bands therebetween having substantially no information signal; and
means for broadcasting the second set of information signals via one or more of a second plurality of broadcast bands, each of the second plurality of broadcast bands associated with and substantially spanning one of the first information signal guard bands.

\* \* \* \* \*